United States Patent [19]

Schober

[11] 4,015,058
[45] Mar. 29, 1977

[54] COMPOSITION WITH DICUMYL PEROXIDE AND PROCESS FOR AVOIDING SCORCHING OF ETHYLENE POLYMER COMPOSITION

[75] Inventor: Donald Lincoln Schober, Belle Mead, N.J.

[73] Assignee: Union Carbide Corporation, New York, N.Y.

[22] Filed: Jan. 23, 1976

[21] Appl. No.: 651,774

Related U.S. Application Data

[63] Continuation-in-part of Ser. No. 527,852, Nov. 27, 1974, abandoned.

[52] U.S. Cl. .................................. 526/57; 526/22; 526/18; 526/20; 526/352; 526/916; 526/330; 526/335

[51] Int. Cl.² .................. C08F 8/06; C08F 8/00

[58] Field of Search ..................... 526/57, 22

[56] References Cited

UNITED STATES PATENTS 3,202,648 8/1965 Latouvette et al. .............. 526/57
3,661,877 5/1972 Bluestein et al. .................. 526/55

Primary Examiner—William F. Hamrock
Attorney, Agent, or Firm—James O. O'Connell

[57] ABSTRACT

Vulcanizable ethylene polymer based compositions which are susceptible to scorching when processed at elevated temperatures, prior to vulcanization, in the presence of dicumyl peroxide, are protected against such scorching by the incorporation therein of cumene hydroperoxide and/or tertiary butyl hydroperoxide.

18 Claims, 5 Drawing Figures

TYPICAL MONSANTO RHEOMETER CURVE

TYPICAL MONSANTO RHEOMETER CURVE

COMPOSITION WITH DICUMYL PEROXIDE AND PROCESS FOR AVOIDING SCORCHING OF ETHYLENE POLYMER COMPOSITION

CROSS-REFERENCES TO RELATED PATENT APPLICATIONS

This patent application is a continuation-in-part of Pat. application Ser. No. 527,852 filed Nov. 27, 1974, now abandoned.

BACKGROUND OF THE INVENTION

1. Field of the Invention

The invention relates to the prevention of scorching, prior to vulcanization, of peroxide curable ethylene polymer based compositions.

2. Description of the Prior Art

Insulation compositions which are employed on electrical wire and cable are, in many cases, prepared from compositions which are based on vulcanizable, or cross-linkable, ethylene polymers. These ethylene polymer based compositions may be vulcanized, or cured, or crosslinked, with various organic peroxide compounds, as disclosed for example in U.S. Pat. Nos. 2,826,570; 2,888,424; 2,916,481; 3,079,370 and 3,296,189.

In the organic peroxide compounds which have been used to date for commercial purposes in these vulcanizable ethylene polymer based compositions, each oxygen atom in the peroxide group, i.e., —O—O—, of such compounds is directly attached to a carbon atom of an organic radical. The commercially useful compositions do not employ hydroperoxide compounds therein as curing agents because they have relatively high decomposition temperatures, and the free radicals provided by the decomposed hydroperoxides are not effective for crosslinking ethylene polymers.

In order to process the organic peroxide containing compositions so as to adapt them to be placed, as insulation, on the electrical conductor components of the wire and cable it is usually necessary to admix the components of the compositions at high temperatures, and to extrude them, again at high temperatures, onto the electrical conductor. These processing activities occur prior to the intended vulcanization of the peroxide containing compositions, which is usually accomplished after such compositions are extruded onto the electrical conductor.

It has been found, however, that when certain of the organic peroxide compounds, such as dicumyl peroxide, are used in combination with certain types of ethylene polymers or in certain types of ethylene polymer based compositions, that the entire curable composition is susceptible to scorching during the high temperature processing thereof prior to the vulcanization of the composition on the electrical conductor. Scorching is, in effect, the premature vulcanization of the insulation composition. This premature vulcanization usually occurs, when it occurs, in the barrel or die head of the extruder in which the insulation composition is being processed, at elevated temperatures, prior to its being extruded onto an electrical conductor, and prior to its intended vulcanization. When an insulation composition is scorched in the extruder, the extruded composition will have imperfections in the form of discontinuity and roughness in the surface of the extrudate; and lumps or surface ripples caused by gel particles in the body of the extrudate. In addition, excessive scorching may cause enough of a pressure build-up in the extrusion device to require a cessation of the extrusion operation entirely.

The tendency of a composition to experience scorch is a relative matter, since any vulcanizable ethylene polymer based composition can be made to scorch if processed under conditions designed to produce such a result. Under a given set of conditions some compositions are more prone to scorching than are others.

Compositions which have been found to be more susceptible to scorching under a given set of conditions are those in which the ethylene polymer has a relatively low melt index and/or a relatively narrow molecular weight distribution.

The tendency of a composition to scorch under commercial operating conditions may be measured by means of the Monsanto Rheometer Test Procedure. The Monsanto Rheometer Test Procedure is described in ASTM-D-2084-71T.

Prior to the work of the present inventor as disclosed in this patent application, and three others filed on even date herewith, scorch prevention has been accomplished by the use of additives such as nitrites as disclosed in U.S. Pat. No. 3,202,648; the specific antioxidants and vulcanization accelerators disclosed in U.S. Pat. No. 3,335,124; and the chain transfer agents disclosed in U.S. Pat. No. 3,578,647. A mixture of two specific peroxides has also been used to provide a rate of cure that is intermediate the rate of cure of either of such peroxides, as disclosed in U.S. Pat. No. 3,661,877.

SUMMARY OF THE INVENTION

It has now been found that vulcanizable ethylene polymer based compositions which employ dicumyl peroxide therein as a vulcanizing agent, and which compositions are susceptible to scorching under a given set of conditions, can be protected against scorching under such conditions by incorporating in such compositions cumene hydroperoxide and/or tertiary butyl hydroperoxide.

An object of the present invention is to provide scorch resistant, vulcanizable, ethylene polymer based compositions.

Another object of the present invention is to provide a process for protecting against scorching vulcanizable ethylene polymer based compositions which employ dicumyl peroxide as a vulcanizing agent and which are susceptible to scorching.

A further object of the present invention is to provide scorch resistant insulation for electrical wire and cable.

A further object of the present invention is to provide a process whereby vulcanizable ethylene polymer based compositions which employ dicumyl peroxide as a vulcanizing agent and which compositions are susceptible to scorching, may be processed in mixing and extruding devices, prior to the vulcanization thereof, at fast throughput rates and at relatively high processing temperatures without experiencing scorching.

These and other objects of the present invention are achieved by employing cumene hydroperoxide and/or tertiary butyl hydroperoxide as scorch preventing agents in the compositions of the present inventions.

THE DRAWINGS

FIGS. 1 and 2 of the drawings show, graphically, Monsanto Rheometer Test curves which were used to illustrate the derivation of an efficiency factor as described below.

DESCRIPTION OF THE PREFERRED EMBODIMENT

The Scorch Resistant Composition

Figure 1:
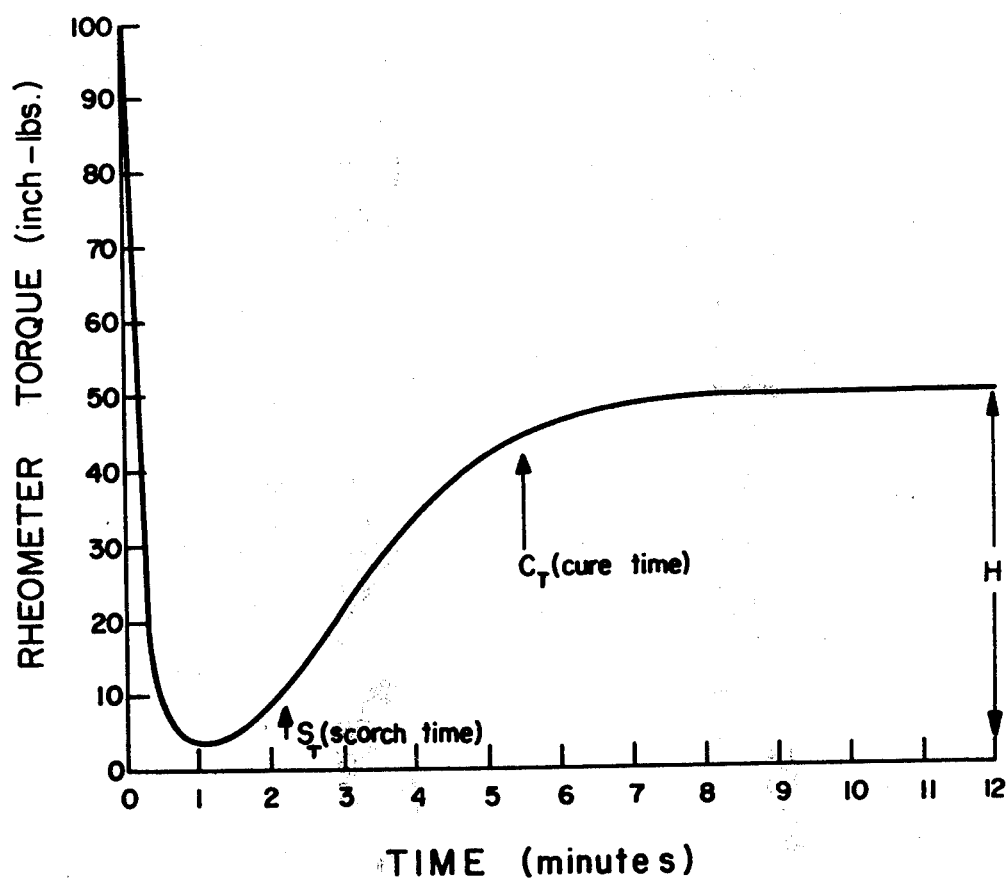

The scorch resistant compositions of the present invention comprise, in weight ratio, 100 parts by weight of ethylene polymer, about 0.1 to 5.0, and preferably 0.2 to 2.0, parts by weight of dicumyl peroxide, and about 0.05 to 2.0, and preferably about 0.1 to 1.0, parts by weight of at least one hydroperoxide which is cumene hydroperoxide and/or tertiary butyl hydroperoxide.

The dicumyl peroxide and the hydroperoxides are used in a weight ratio, to each other, of about 4:1 to 40:1 and preferably of about 8:1 to 15:1.

Ethylene Polymer

The ethylene polymers which are used in the compositions of the present invention are solid (at 25° C.) materials which may be homopolymers, or copolymers of ethylene. The ethylene copolymers contain at least 30 weight percent of ethylene and up to about 70 weight percent of propylene, and/or up to about 50 weight percent of one or more other organic compounds which are interpolymerizable with ethylene. These other compounds which are interpolymerizable with ethylene are preferably those which contain polymerizable unsaturation, such as is present in compounds containing an ethylene linkage, >C = C<. These other interpolymerizable compounds may be hydrocarbon compounds such as, butene-1, pentene-1, isoprene, butadiene, bicycloheptene, bicycloheptadiene, and styrene, as well as vinyl compounds such as vinyl acetate and ethyl acrylate.

These compounds could thus include those containing >0 to 70 weight percent of propylene and 30 to <100 weight percent of ethylene; and >0 to <50 weight percent of butene-1 or vinyl acetate and 50 to <100 weight percent of ethylene; and >0 to <30 weight percent of propylene, >0 to 20 weight percent of butene-1 and 50 to <100 weight percent of ethylene.

The ethylene polymers may be used individually, or in combinations thereof. The ethylene polymers have a density (ASTM 1505 test procedure with conditioning as in ASTM D-1248-72) of about 0.86 to 0.96 and a melt index (ASTM D-1238 at 44 psi test pressure) of about 0.1 to 20 decigrams per minute.

Adjuvants

In addition to the ethylene polymer, and the peroxide compounds, the compositions of the present invention also advantageously include about 0.01 to 3.0 and, preferably 0.05 to 1.0, parts by weight of one or more suitable high temperature antioxidants for the ethylene polymer, per 100 parts by weight of ethylene polymer in such compositions.

These antioxidants are preferably sterically hindered phenols. Such compounds would include 1,3,5-trimethyl-2,4,6-tris(3,5-ditertiary butyl-4-hydroxy benzyl)benzene; 1,3,5-tris(3,5-ditertiary butyl-4-hydroxy benzyl)-5-triazine-2,4,6-(1H,3H,5H)trione; tetrakis-[methylene-3-(3',5-di-t-butyl-4'-hydroxy phenyl)-propionate]methane; and di(2-methyl-4-hydroxy-5-t-butyl phenyl)sulfide. Polymerized 2,2,4-trimethyl dihyroquinoline may also be used.

Other adjuvants which may be employed in the compositions of the present invention would include adjuvants commonly employed in vulcanizable ethylene polymer based compositions including fillers, such as carbon black, clay, talc and calcium carbonate; blowing agents; nucleating agents for blown systems; lubricants; UV stabilizers; dyes and colorants; voltage stabilizers; metal deactivators and coupling agents.

These adjuvants would be used in amounts designed to provide the intended effect in the resulting composition.

The compositions of the present invention may also be extended, or filled, with polymers other than the ethylene polymer which are compatible, i.e., can be physically blended or alloyed, with the ethylene polymer. The resulting compositions should contain at least about 30 weight percent of interpolymerized ethylene in all the polymers that may be present in the composition, based on the total weight of the resulting composition. The other polymers which may be used would include polyvinyl chloride and polypropylene.

The total amount of adjuvants used will range from 0 to about 60 weight percent based on the total weight of the composition.

Processing of the Compositions

All of the components of the compositions of the present invention are usually blended or compounded together prior to their introduction into the extrusion device from which they are to be extruded onto an electrical conductor. The ethylene polymer and the other desired constituents may be blended together by any of the techniques used in the art to blend and compound thermoplastics to homogeneous masses. For instance, the components may be fluxed on a variety of apparatus including multi-roll mills, screw mills, continuous mixers, compound extruders and Banbury mixers, or dissolved in mutual or compatible solvents.

When all the solid components of the composition are available in the form of a powder, or as small particles, the compositions are most conveniently prepared by first making a blend of the components, say in a Banbury mixer or a continuous extruder, and then masticating this blend on a heated mill, for instance a two-roll mill, and the milling continued until an intimate mixture of the components is obtained. Alternatively, a master batch containing the ethylene polymer(s) and the antioxidant(s) and, if desired, some or all of the other components, may be added to the mass of polymer. Where the ethylene polymer is not available in powder form, the compositions may be made by introducing the polymer to the mill, masticating it until it forms a band around one roll, after which a blend of the remaining components is added and the milling continued until an intimate mixture is obtained. The rolls are preferably maintained at a temperature which is within the range 80° to 150° C. and which is below the decomposition temperatures of the first peroxide compound(s). The composition, in the form of a sheet, is removed from the mill and then brought into a form, typically dice-like pieces, suitable for subsequent processing.

After the various components of the compositions of the present invention are uniformly admixed and blended together, they are further processed, in accordance with the process of the present invention, in conventional extrusion apparatus at about 120° to 160° C.

After being extruded onto a wire or cable, or other substrate, the compositions of the present invention are vulcanized at elevated temperatures of about $\geq 180°$ C. and preferably at $\geq 215°-230°$ C. using conventional vulcanizing procedures.

Derivation of Curing System Efficiency Factor

In the Monsanto Rheometer Test Procedure a sample of the vulcanizable composition is measured in a rheometer before the composition is subject to high temperature mixing or extrusion conditions. The test results are plotted as functions of inch-pounds of torque versus time. The compositions which are less susceptible to scorching are those that experience, after the minimum torque value is achieved, a delay in the rise of the torque values followed by a fast rise in the torque values to the level required for the intended end use of the composition being evaluated.

The Monsanto Rheometer Test Procedure is, in effect, a means for comparatively evaluating, graphically, the susceptibility of different vulcanizable compositions to scorch. In this way the use of different curing agents, or curing agent compositions, in such vulcanizable compositions, can also be graphically compared.

For the purposes of the present invention, a procedure has now been devised whereby, using the graphical results of Monsanto Rheometer Test procedures, the efficiency of different curable compositions, relative to the susceptibility of such compositions to scorching, can also be numerically compared. By using this new evaluation procedure, a separate and distinct numerical-efficiency factor (E) can be assigned to each curable composition. To make these efficiency factors more meaningful, for comparison purposes, they should be based on rheometer curves which are all obtained when the curable compositions being compared are evaluated under the same test conditions. In all the experiments reported herein the test samples were evaluated in a Monsanto Rheometer at a cure temperature of 360° F., using a rheometer oscillation of 110 CPM and an arc of $\pm 5°$.

There is also provided here below, the derivation of a numerical efficiency factor (E) for vulcanizable compositions. The derivation employs typical rheometer curves that were arbitrarily drawn, and which are not based on actual experiments. Such curves are shown in FIGS. 1 and 2 of the drawings.

Figure 2:
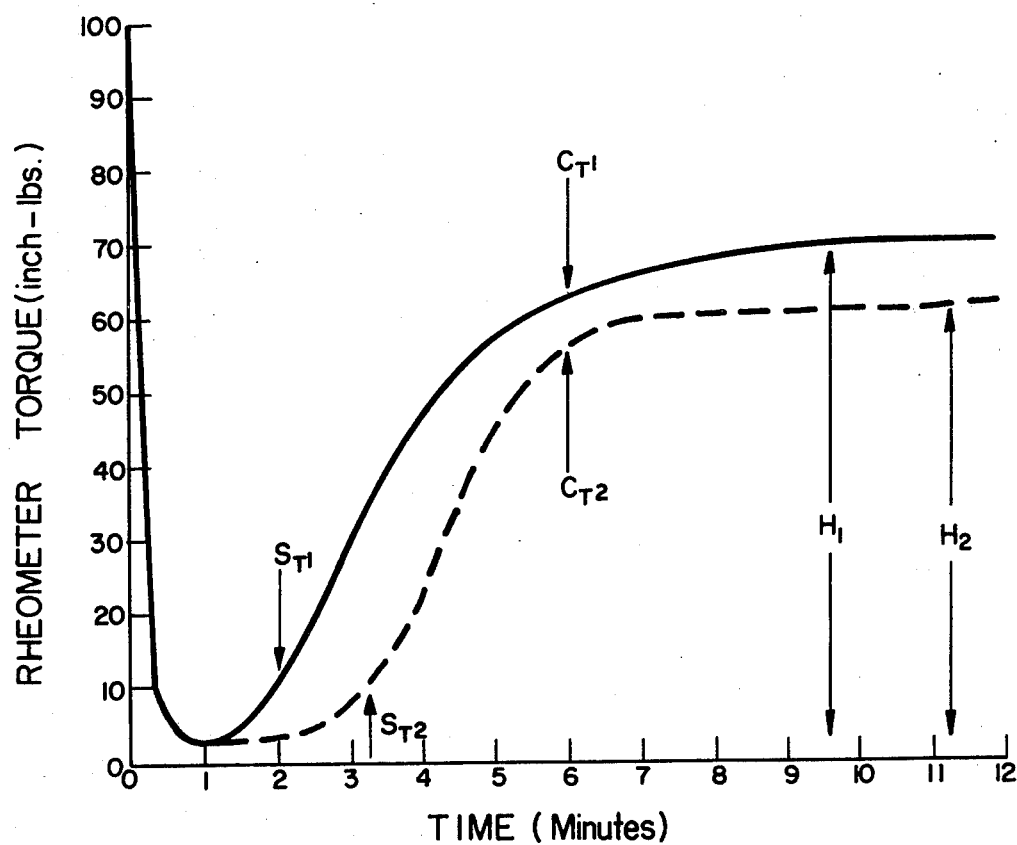

A typical Monsanto Rheometer curve, as shown graphically in FIG. 1, contains several parameters which are used in the derivation of the efficiency factor (E). The optimum cure level (highest cross-link density) is designated as H. H is measured in terms of inch-pounds of torque on the rheometer test equipment. A higher value for corresponds to a higher cross-link density.

The time, in minutes, required to reach 90% of the maximum cure (H) is designated as $C_T$. Thus, in FIG. 1, H is 50 inch-pounds and $C_T$ is 5.5 minutes, which is the time required to reach a level of 45 (or 90% of 50) inch-pounds of torque during the test procedure.

The scorch time, $S_T$, is defined as the point in time, in minutes, at which the curve reaches a rheometer level of 10 inch-pounds of torque on the upswing of the curve. In FIG. 1, $S_T$ is about 2.1 minutes.

In general, one is interested in getting to the maximum cure (H) as soon as possible. In other words, a short $C_T$ is desirable. At the same time, one would like $S_T$ to be as long as possible since a longer $S_T$ means the vulcanizable composition being evaluated can be processed at a higher speed or at a higher temperature. That is, it would be less scorchy. Thus it is important to discuss the time intervals between $C_T$ and $S_T$, or $C_T - S_T$ since $C_T$ is, arbitrarily, always longer than $S_T$.

Then, too, it is of interest to compare $S_T$ with $C_T - S_T$ since the best vulcanizable system would be one whose $S_T$ is relatively long, and whose difference between $C_T$ and $S_T$, $(C_T - S_T)$, would be relatively short. Thus, the ratio $S_T/C_T - S_T$ is of importance. The larger is this ratio, the less susceptible is the vulcanizable composition to scorching.

Finally, the times ($C_T$ and $S_T$) are related to the maximum cure point, H. Thus, if one can maintain the same $S_T$, and yet reach a higher H, one can thereby provide a vulcanizable composition that is less susceptible to scorch. When vulcanizable compositions are cured by peroxide curing agent systems, particularly those using individual peroxides such as dicumyl peroxide, as you increase the value of H, by simply adding more of the peroxide curing agent, you decrease $S_T$.

The efficiency of a particular curing agent system, therefore, when used with a given vulcanizable composition, and cured at a given temperature, can be determined by multiplying H by $S_T / C_T - S_T$ or, as shown in Equation I:

$$E = \frac{H \times S_T}{C_T - S_T} \qquad (I)$$

The numerical efficiency (E) of the arbitrary curing agent system shown graphically in FIG. 1 therefore, would, be $$E = \frac{H \times S_T}{C_T - S_T} = \frac{(50)(2.1)}{5.5 - 2.1} = 30.9$$

To further illustrate the utility of this method, for the purposes of comparatively evaluating different vulcanizable compositions, reference is made to FIG. 2 of the drawings in which there is graphically presented typical Monsanto Rheometer curves 1 and 2 that were also arbitrarily drawn, and which are not based on actual experiments.

It should be noted from a review of FIG. 2 that the cure times $C_{T-1}$ for composition 1 and $C_{T-2}$ for composition 2, are the same for both compositions and each curve reaches a relatively high torque level with the value of $H_1$ (for composition 1) which is 70, being relatively close to the value of $H_2$ (for composition 2) which is 62. $S_{T-2}$ (for composition 2), however, is more than a minute longer than $S_{T-1}$ (for composition 1), 3.2 vs 2.0 minutes. Thus, it is quite obvious from a review of these two curves that curve 2 represents the better cure system. If one maintains the same $C_T$, and reaches almost the same maximum cross-link density (H), then increasing $S_T$ must lead to a better curing system, in accordance with the above definition of E.

A calculation of the relative numerical efficiencies of the curable compositions shown graphically in FIG. 2 is shown below: Efficiency ($E_1$) of composition 1, based on curve 1:

$$E_1 = \frac{H_1 \times S_{T1}}{C_{T1} - S_{T1}} = \frac{(70)(2)}{(6-2)} = \frac{140}{4} = 35.0$$

Efficiency ($E_2$) of composition 2, based on curve 2:

$$E_2 = \frac{H_2 \times S_{T2}}{C_{T2} - S_{T2}} = \frac{(62)(3.2)}{(6-3.2)} = \frac{198.4}{2.8} = 70.8$$

Thus, this efficiency factor, E, is a useful parameter and it can be shown that in fact a higher value for E represents a better system, as defined above, and represents improved utility for such better system. The use of this efficiency factor, E, can also apply to comparisons of Rheometer test curves where the maximum cure (H) shown in each curve is vastly different, since the calculation of E is, in effect, a normalization procedure.

The compositions of the present invention have an efficiency factor (E), as determined above, which is at least about 3, and is preferably more than 10 to 15, units of such efficiency factor above the efficiency factor of such compositions in the absence of the cumene hydroperoxide and/or tertiary butyl hydroperoxide.

The following examples are merely illustrative of the present invention and are not intended as a limitation upon the scope thereof.

General Admixing Procedure

The vulcanizable compositions used in Examples 1–15 below were all prepared by the following procedure:

100 parts by weight of the ethylene polymer were fluxed in a Banbury mixer at approximately 120° C. The additives, i.e., anti-oxidant, and the peroxides and, where used, other adjuvants, were then added to the fluxed mixture. The resulting composition was then blended for 2–3 minutes and then transferred to a 2-roll mill for sheeting. The hot rolled sheet was then chopped on a hot granulator to yield a chipped product.

The chips were then compression molded into plaques for use in Monsanto Rheometer test procedures. All of the rheometer data which was then obtained on the samples, unless otherwise stipulated, was obtained at 360° F. (182.2° C.).

EXAMPLES 1–3

The following three vulcanizable compositions were prepared as in The General Admixing Procedure utilizing dicumyl peroxide (DCP) with a low density ethylene homopolymer I [having a density of 0.919, a melt index of 1.6 to 2.2 (IP, 190° C.)] and the hydroperoxides as shown in Table I. All of the samples contained 0.2 parts by weight di(2-methyl-4-hydroxy-5-t-butyl phenyl)sulfide as antioxidant.

TABLE I

| Components | Compositions of Examples 1–3 in parts by weight | | |
|---|---|---|---|
| | 1 | 2 | 3 |
| ethylene homopolymer I | 100.0 | 100.0 | 100.0 |
| dicumyl peroxide | 2.0 | 2.0 | 2.0 |
| Cumene hydroperoxide | — | 0.2 | — |
| t-butyl hydroperoxide | — | — | 0.2 |
| Efficiency Factor - E | 20.5 | 24.1 | 23.5 |

The efficiency Factors for each of the compositions of Examples 1–3 were obtained on the basis of Monsanto Rheometer Test Curves (not shown) which disclosed the following test data for each of the test compositions:

TABLE II

| Test data - for compositions of Examples | 1 | 2 | 3 |
|---|---|---|---|
| $S_T$, minutes | 1.75 | 2.8 | 2.5 |
| $C_T$, minutes | 5.5 | 5.6 | 5.6 |
| H, inch-pounds | 44.0 | 24.0 | 29.0 |

The Efficiency Factors for these compositions indicates that the addition of either hydroperoxide to the homopolymer based system improved the scorch resistance of the system which also contained dicumyl peroxide.

EXAMPLES 4–6

The following three mixtures were prepared as in The General Admixing Procedure utilizing dicumyl peroxide in a low density ethylene-vinyl acetate copolymer I (containing 10% of vinyl acetate by weight, and having a density of about 0.92 and a melt index of about 3) and the hydroperoxides as shown in Table III. All the compositions contained the same amount of the same antioxidant as was utilized in Examples 1–3.

TABLE III

| Component | Compositions of Examples 4–6 in parts by weight | | |
|---|---|---|---|
| | 4 | 5 | 6 |
| Ethylene copolymer I | 100.0 | 100.0 | 100.0 |
| Dicumyl peroxide | 2.0 | 2.0 | 2.0 |
| Cumene Hydroperoxide | — | 0.5 | — |
| t-butyl Hydroperoxide | — | — | 0.5 |
| Efficiency Factor - E | 15.4 | 31.4 | 34.6 |

The Efficiency Factors for each of the compositions of Examples 4–6 were obtained on the basis of Monsanto Rheometer Test Curves (not shown) which disclosed the following test data for each of the test compositions:

TABLE IV

| Test Data - for the compositions of Examples | 4 | 5 | 6 |
|---|---|---|---|
| $S_T$, minutes | 0.9 | 2.15 | 2.3 |
| $C_T$, minutes | 4.9 | 5.5 | 5.5 |

TABLE IV-continued

| Test Data - for the compositions of Examples | 4 | 5 | 6 |
|---|---|---|---|
| H, inch-pounds | 68.5 | 49.0 | 48.0 |

The Efficiency Factors for these compositions indicates that the addition of either of the hydroperoxides also improves the scorch resistance of ethylene-vinyl acetate copolymer based composition containing dicumyl peroxide.

EXAMPLES 7 to 9

Three vulcanizable mixtures were prepared using the ethylene polymer (Copolymer I) employed in Examples 4–6 with the addition of 35 parts by weight of a furnace grade carbon black and polymerized 2,2,4 trimethyl dihydroquinoline as the antioxidant. The results are shown in Table V.

TABLE V

| Component | Compositions of Examples 7–9 in parts by weight | | |
|---|---|---|---|
|  | 7 | 8 | 9 |
| Copolymer I | 100.0 | 100.0 | 100.0 |
| Carbon Black | 35.0 | 35.0 | 35.0 |
| Antioxidant | 0.5 | 0.5 | 0.5 |
| Dicumyl peroxide | 1.6 | 2.0 | 2.0 |
| Cumene Hydroperoxide | — | 0.5 | — |
| t-butyl Hydroperoxide | — | — | 0.2 |
| Efficiency Factor | 20.6 | 33.7 | 33.3 |

Figure 3:
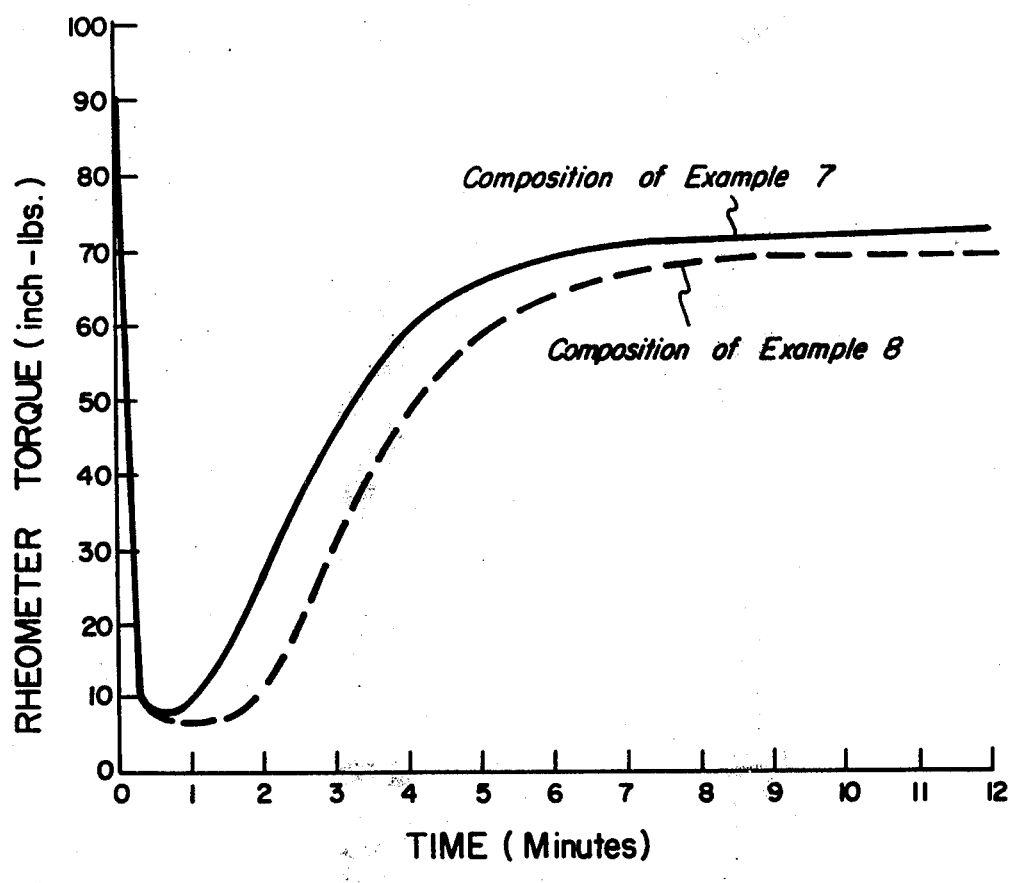
FIG. 3 shows, graphically, Monsanto Rheometer Test curves for the compositions of Examples 7 and 8.

The Efficiency Factors for each of the compositions of Examples 7–9 was obtained on the basis of Monsanto Rhemometer Test Curves. The test curve for the composition of Example 9 is not shown. The test curves for the compositions of Examples 7 and 8 are shown in FIG. 3 of the drawings. The test curves for these three compositions disclosed the following test data for each of the test compositions:

TABLE VI

| Test Data - for the compositions of Examples | 7 | 8 | 9 |
|---|---|---|---|
| $S_T$, minutes | 1.1 | 1.8 | 1.1 |
| $C_T$, minutes | 5.0 | 5.5 | 4.6 |
| H, inch-pounds | 73.0 | 69.0 | 106.0 |

The Efficiency Factors for these compositions indicates that the addition of either hydroperoxide to the filled composition greatly improves the scorch resistance of the formulation.

EXAMPLES 10–11

As a further illustration of the increase in scorch resistance, and of the increased extrusion rate, that can be realized from the principles of this invention, the compositions of Examples 7 and 8 were extruded on wire and the effect of the resulting changes in extruder rpm on "scorch" was observed during such extrusion operations.

Scorch can easily be detected in such an operation. The first thing that is noticeable is the sudden increase in the head pressure in the extruder, and with that, the appearance of gels in the extruded coating on the coated cable, indicating that scorch has occurred in the coating.

In this set of experiments, the extruder heater profile was kept the same (240° F. for all 5 zones), the screw water temperature was maintained at 150° F., and the temperature of the composition in the head of the extruder was measured by the use of a thermocouple. This extrusion work was performed on a 2½ inch, 16:1 (length/diameter ratio) Royle extruder using 0.032 inch of insulation coating on No. 14 Cu conductor substrate.

After the extruder was first purged with some of the test composition and the wire line adjusted properly, the rpm of the extruder was slowly increased until the scorch point, as defined above, was observed.

The relevant data on head pressures, composition temperatures, extruder rpm, and output of extruded composition are shown below in Tables VII and VIII.

TABLE VII

| RPM | Composition Temp. (° C.) | Example 10[1] Head Pressure (psi) | Output (grams/min.) |
|---|---|---|---|
| 25 | 118 | 2200 | — |
| 50 | 138 | 2400 | — |
| 60 | 145 | 2450 | — |
| 70 | 150 | 2550 | — |
| 80 | 157[3] | 2900[2] | 708 |

[1]contains only dicumyl peroxide (composition of Example 7).
[2]Scorch point - gels appeared on cable. Pressure measured at the extruder head.
[3]Compound temperature inside the extruder head.

Figure 4:
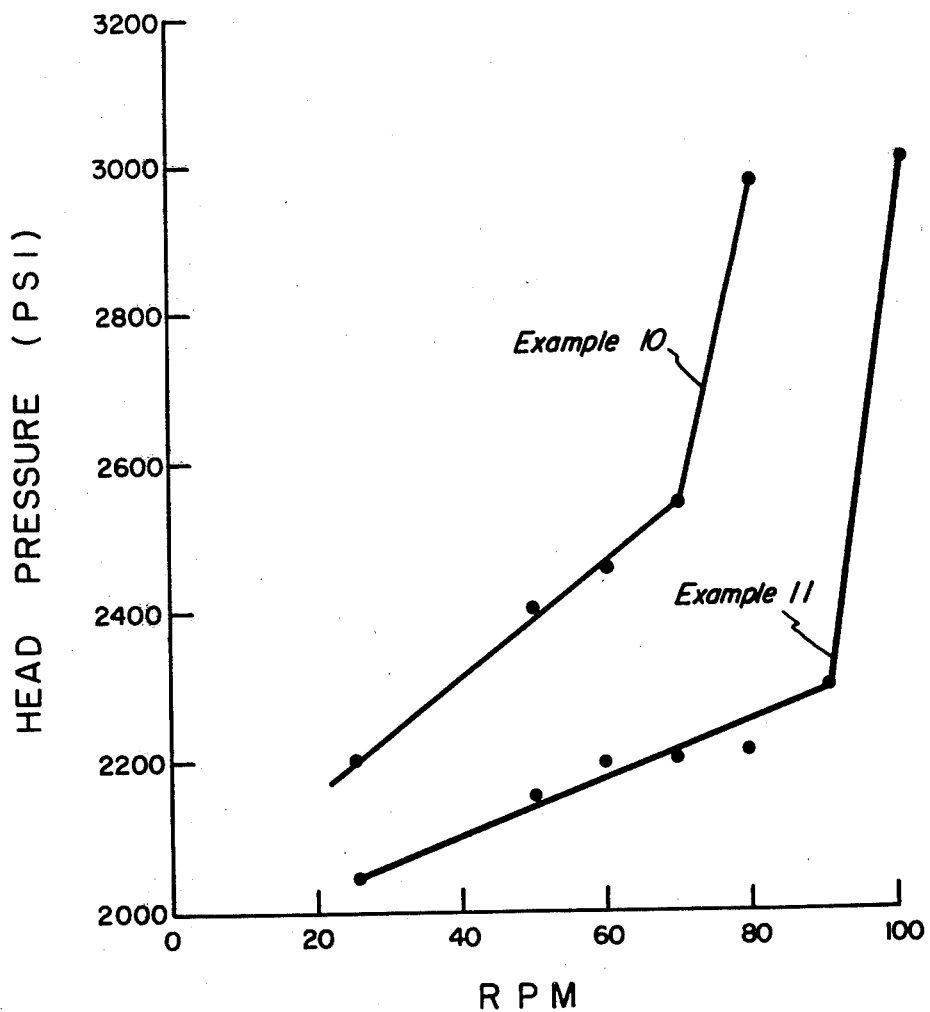
FIG. 4 shows, graphically, plots of the extruder head pressure vs extruder rpm which were encountered in the extrusion of the compositions of Examples 10 and 11.

An examination of the data reported in Table VII indicates that the basic peroxide system (dicumyl peroxide with ethylene polymer) begins to scorch at 80 RPM when the composition temperature reaches 157° C. at an extruder output of 708 grams/minute. The resulting profile of head pressure vs rpm which was achieved in the extrusion process of Example 10 is shown in FIG. 4 of the drawings.

TABLE VIII

| RPM | Composition Temp. (° C.) | Example 11[4] Head Pressure (psi) | Output (grams/min.) |
|---|---|---|---|
| 25 | 118 | 2050 | — |
| 50 | 135 | 2150 | — |
| 60 | 142 | 2200 | — |
| 70 | 150 | 2200 | — |
| 80 | 156 | 2200 | — |
| 90 | 163 | 2300 | — |
| 100 | 170[6] | 3000[5] | 840 gms/min |

[4]contains dicumyl peroxide and cumene hydroperoxide (composition of Example 8)
[5]scorch point; pressure measured at extruder head
[6]compound temperature inside the extruder head.

An examination of the data reported in Table VIII indicates that in fact the mixed peroxide system of Example 11 does indeed run ~ 20% faster (100 rpm vs 80 rpm before scorch sets in. Also, this is reflected in the increase of the temperature of the composition which can be achieved (170° C. vs 157° C.) in the extruder before scorch appears.

The resulting profile of head pressure vs rpm which was achieved in the extrusion process of Example 11 is also shown in FIG. 4 of the drawings in comparison to the profile obtained in Example 10.

An examination of all the data obtained in Examples 10 and 11 illustrates the utility of the present invention in providing for increased extrusion rates and greater scorch resistance with ethylene polymer based compositions which are cured with peroxide curing agents.

EXAMPLES 12–13

The following two mixtures were prepared as in Examples 1–3 utilizing dicumyl peroxide with an ethylenepropylene-diene terpolymer (Nordell 1500 resin sold by duPont) that contained about 16 mole percent (22.4 weight %) of propylene, and 83 mole percent (77.5 weight %) of ethylene and a small amount (about 1 mole %) of an unidentified (diene) monomer. Cumene hydroperoxide was used as the hydroperoxide and di(2-methyl-4-hydroxy-5-t-butyl-phenyl)sulfide was used as the antioxidant as shown in Table IX.

TABLE IX

| Component | Compositions of Examples 12–13 in parts by weight | |
|---|---|---|
| | 12 | 13 |
| Terpolymer | 100.0 | 100.0 |
| Antioxidant | 0.2 | 0.2 |
| Dicumyl peroxide | 1.5 | 2.0 |
| Cumene hydroperoxide | 0.0 | 0.5 |
| Efficiency Factor | 22.5 | 34.3 |

Figure 5:
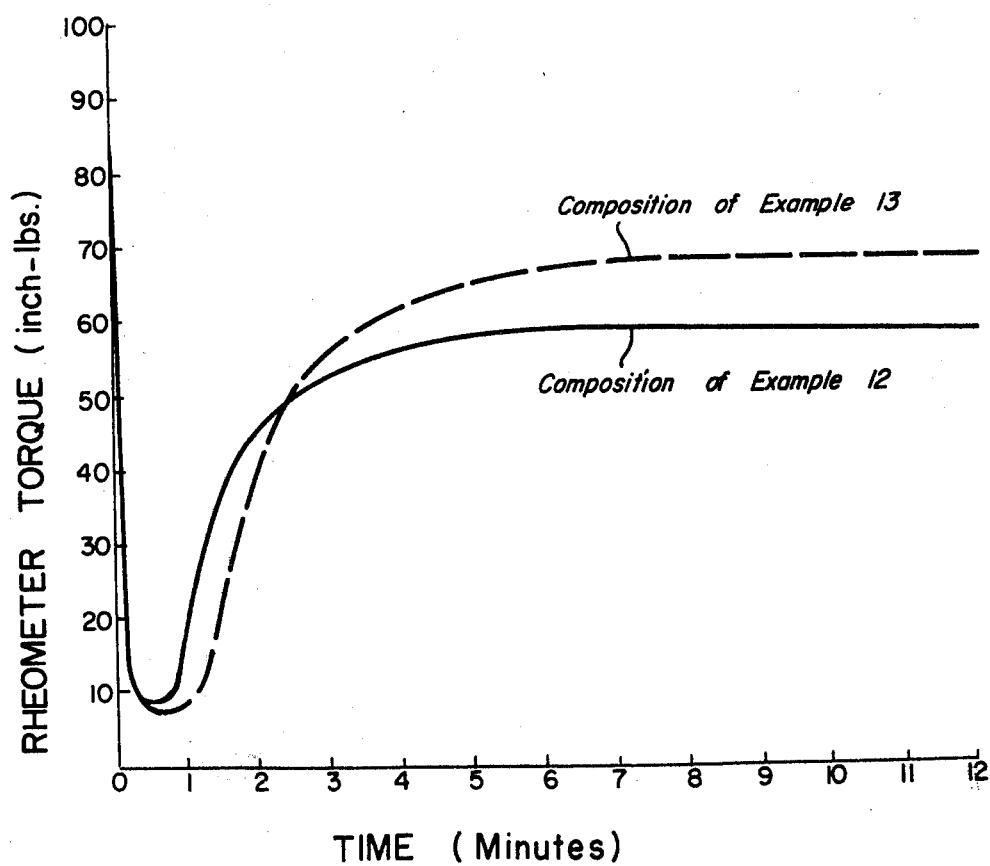
FIG. 5 shows, graphically, Monsanto Rheometer Test curves for the compositions of Examples 12 and 13.

The Efficiency Factors for each of the compositions of Example 12–13 were obtained on the basis of Monsanto Rheometer Test Curves. The test curves for the compositions of Examples 12 and 13 are shown in FIG. 5 of the drawings. The test curves for these two compositions disclosed the following test data for each of the test compositions:

TABLE X

| Test Data - for the compositions of Examples | 12 | 13 |
|---|---|---|
| $S_r$, minutes | 0.8 | 1.2 |
| $C_r$, minutes | 2.9 | 3.6 |
| H, inch-pounds | 59.0 | 68.5 |

The Efficiency Factors for these compositions indicates that the addition of the hydroperoxide to the terpolymer based system substantially improved the scorch resistance of the system which contained dicumyl peroxide.

EXAMPLES 14–15

The following two mixtures were prepared as in Examples 1–3 with an ethylene-ethyl acrylate copolymer (Copolymer III) which contained 15% by weight of ethyl acrylate and which had a density of about 0.92 and a melt index of 1.6 – 2.2, and the peroxides as shown in Table XI. Di(2-methyl-4-hydroxy-5-t-butyl-phenyl)sulfide was used as the antioxidant.

TABLE XI

| Component | Compositions of Examples 14–15 in parts by weight | |
|---|---|---|
| | 14 | 15 |
| Copolymer III | 100.0 | 100.0 |
| Antioxidant | 0.2 | 0.2 |
| dicumyl peroxide | 2.0 | 2.0 |
| cumene hydroperoxide | 0 | 0.3 |
| Efficiency Factor | 14.7 | 25.9 |

The Efficiency Factors for each of the compositions of Examples 14–15 were obtained on the basis of Monsanto Rheometer Test Curves (not shown). The test curves for these two compositions disclosed the following test data for each of the test compositions:

TABLE XII

| Test Data for the compositions of Examples | 14 | 15 |
|---|---|---|
| $S_r$, minutes | 0.9 | 1.8 |
| $C_r$, minutes | 5.0 | 5.7 |
| H, inch-pounds | 67.0 | 56.0 |

The Efficiency Factors for these compositions indicates that the addition of the hydroperoxide to the Copolymer III based system can provide excellent improvement in scorch resistance.

In all cases the TBH was used in the form of a mixture of 90% tertiary butyl hydroperoxide and 10% tertiary butyl alcohol.

What is claimed is:

1. A scorch resistant vulcanizable composition comprising, in weight ratio,
   100 parts by weight of ethylene polymer, about 0.1 to 5.0 parts by weight of dicumyl peroxide, and
   about 0.05 to 2.0 parts by weight of at least one hydroperoxide selected from the group consisting of cumene hydroperoxide and tertiary butyl hydroperoxide,
   said dicumyl peroxide and said hydroperoxide being used in a weight ratio, to each other, of about 4:1 to 40:1, and
   said composition having an efficiency factor of at least about 3 units above the efficiency factor of said composition in the absence of said hydroperoxide when said efficiency factor is determined on the basis of rheometer curves obtained from a Monsanto Rheometer at a cure temperature of 360° F., usng a rheometer oscillation of 110 CPM and an arc of ± 5°.

2. A composition as in claim 1 in which said ethylene polymer is a homopolymer.

3. A composition as in claim 1 in which said ethylene polymer is a copolymer of at least 30 weight percent of ethylene and up to about 70 weight percent of at least one other organic compound which is interpolymerizable therewith.

4. A composition as in claim 3 in which said ethylene polymer is an ethylene-vinyl acetate copolymer.

5. A composition as in claim 3 in which said ethylene polymer is an ethylene-propylene-diene terpolymer.

6. A composition as in claim 2 in which said hydroperoxide is cumene hydroperoxide.

7. A composition as in claim 2 in which said hydroperoxide is tertiary butyl hydroperoxide.

8. A composition as in claim 3 in which said hydroperoxide is cumene hydroperoxide.

9. A composition as in claim 3 in which said hydroperoxide is tertiary butyl hydroperoxide.

10. A process for preventing the scorching of a vulcanizable composition which is susceptible to scorching during the processing thereof at temperatures of about 120° to 160° C. prior to the intended vulcanization thereof, said composition comprising, in weight ratio, 100 parts by weight of ethylene polymer, and about 0.1 to 5.0 parts by weight of dicumyl peroxide, which comprises, admixing into said composition, prior to said processing, sufficient amounts of at least one hydroperoxide selected from the group consisting of cumene hydroperoxide and tertiary butyl hydroperoxide as to increase the efficiency factor of said compositions at least about 3 units when said efficiency factor is determined on the basis of rheometer curves obtained from a Monsanto Rheometer at a cure temperature of 360° F. using a rheometer oscillation of 110 CPM and an arc of ± 5°, said dicumyl peroxide and said hydroperoxide being used in a weight ratio, to each other, of about 4:1 to 40:1, and vulcanizing the resulting composition.

11. A process as in claim 10 in which said ethylene polymer is a homopolymer.

12. A process as in claim 10 in which said ethylene polymer is a copolymer of at least 30 weight percent of ethylene and up to about 70 weight percent of at least one other organic compound which is interpolymerizable therewith.

13. A process as in claim 12 in which said ethylene polymer is an ethylene-vinyl acetate copolymer.

14. A process as in claim 12 in which said ethylene polymer is an ethylene-propylene-diene terpolymer.

15. A process as in claim 11 in which said hydroperoxide is cumene hydroperoxide.

16. A process as in claim 11 in which said hydroperoxide is tertiary butyl hydroperoxide.

17. A process as in claim 12 in which said hydroperoxide is cumene hydroperoxide.

18. A process as in claim 12 in which said hydroperoxide is tertiary butyl hydroperoxide.

* * * * *

UNITED STATES PATENT OFFICE
CERTIFICATE OF CORRECTION

Patent No. 4,015,058   Dated   March 29, 1977

Inventor(s)   D. L. Schober

It is certified that error appears in the above-identified patent and that said Letters Patent are hereby corrected as shown below:

Column 3, line 45, "compounds" should read --copolymers--.

Column 5, line 62, "for" should read --for H--.

Column 9, line 34, "Rhemometer" should read --Rheometer--.

Column 11, line 17, "ethylenepropylene" should read --ethylene-propylene--.

Signed and Sealed this

Fourteenth Day of June 1977

[SEAL]

Attest:

RUTH C. MASON
Attesting Officer

C. MARSHALL DANN
Commissioner of Patents and Trademarks